(12) United States Patent
Golwala et al.

(10) Patent No.: US 11,974,378 B2
(45) Date of Patent: Apr. 30, 2024

(54) METHODS AND ARRANGEMENTS FOR FALSE TRIGGER PREVENTION

(71) Applicant: Leviton Manufacturing Co., Inc., Melville, NY (US)

(72) Inventors: Abhishek Golwala, Northvale, NJ (US); A. M. Sarwar Jahan, Jamaica, NY (US); Ankit Sanghvi, Hicksville, NY (US); Alfred J. Lombardi, Syosset, NY (US)

(73) Assignee: Leviton Manufacturing Co., Inc., Melville, NY (US)

( * ) Notice: Subject to any disclaimer, the term of this patent is extended or adjusted under 35 U.S.C. 154(b) by 239 days.

(21) Appl. No.: 17/505,954

(22) Filed: Oct. 20, 2021

(65) Prior Publication Data

US 2022/0128728 A1    Apr. 28, 2022

Related U.S. Application Data

(60) Provisional application No. 63/105,980, filed on Oct. 27, 2020.

(51) Int. Cl.
| | |
|---|---|
| *H05B 47/13* | (2020.01) |
| *G01H 1/00* | (2006.01) |
| *G01J 1/44* | (2006.01) |
| *G08B 13/19* | (2006.01) |

(52) U.S. Cl.
CPC .............. *H05B 47/13* (2020.01); *G01H 1/00* (2013.01); *G01J 1/44* (2013.01); *G08B 13/19* (2013.01); *G01J 2001/444* (2013.01)

(58) Field of Classification Search
CPC ...... H05B 47/13; G08B 29/185; G08B 13/19; G08B 29/26
See application file for complete search history.

(56) References Cited

U.S. PATENT DOCUMENTS

| | | | | |
|---|---|---|---|---|
| 5,578,988 | A | * | 11/1996 | Hoseit ................ G08B 13/2494 340/552 |
| 5,793,288 | A | * | 8/1998 | Peterson ................ G08B 13/19 340/567 |
| 5,870,022 | A | * | 2/1999 | Kuhnly .................. G08B 13/19 340/567 |
| 7,924,155 | B2 | | 4/2011 | Soccoli et al. |
| 8,981,299 | B2 | | 3/2015 | Soccoli et al. |
| 9,271,375 | B2 | | 2/2016 | Balasubramanian et al. |

(Continued)

*Primary Examiner* — Mirza F Alam
(74) *Attorney, Agent, or Firm* — KDW Firm PLLC

(57) ABSTRACT

A occupancy sensor device comprising an occupancy sensor to output a detection signal, the detection signal including one or more pulses, the one or more pulses comprising one or more characteristics indicative of either detection of a motion or detection of a disturbance; a controller coupled with the sensor to receive the detection signal, the controller programmed to compare the one or more characteristics of the one or more pulses against a predetermined characteristic threshold, and based on the comparison, determine whether the one or more pulses indicate detection of the motion or detection of the disturbance. A machine readable-medium to comprise code for the controller. And, a device comprising an occupancy sensor and a vibration sensor to correlate vibrations with an output from the occupancy sensor to prevent false triggers.

27 Claims, 10 Drawing Sheets

(56) References Cited

U.S. PATENT DOCUMENTS

2002/0175815 A1* 11/2002 Baldwin ............... H05B 47/13
                                                                                          250/221
2016/0126733 A1    5/2016 Hick et al.
2017/0117108 A1* 4/2017 Richardson ............ H05B 47/12

* cited by examiner

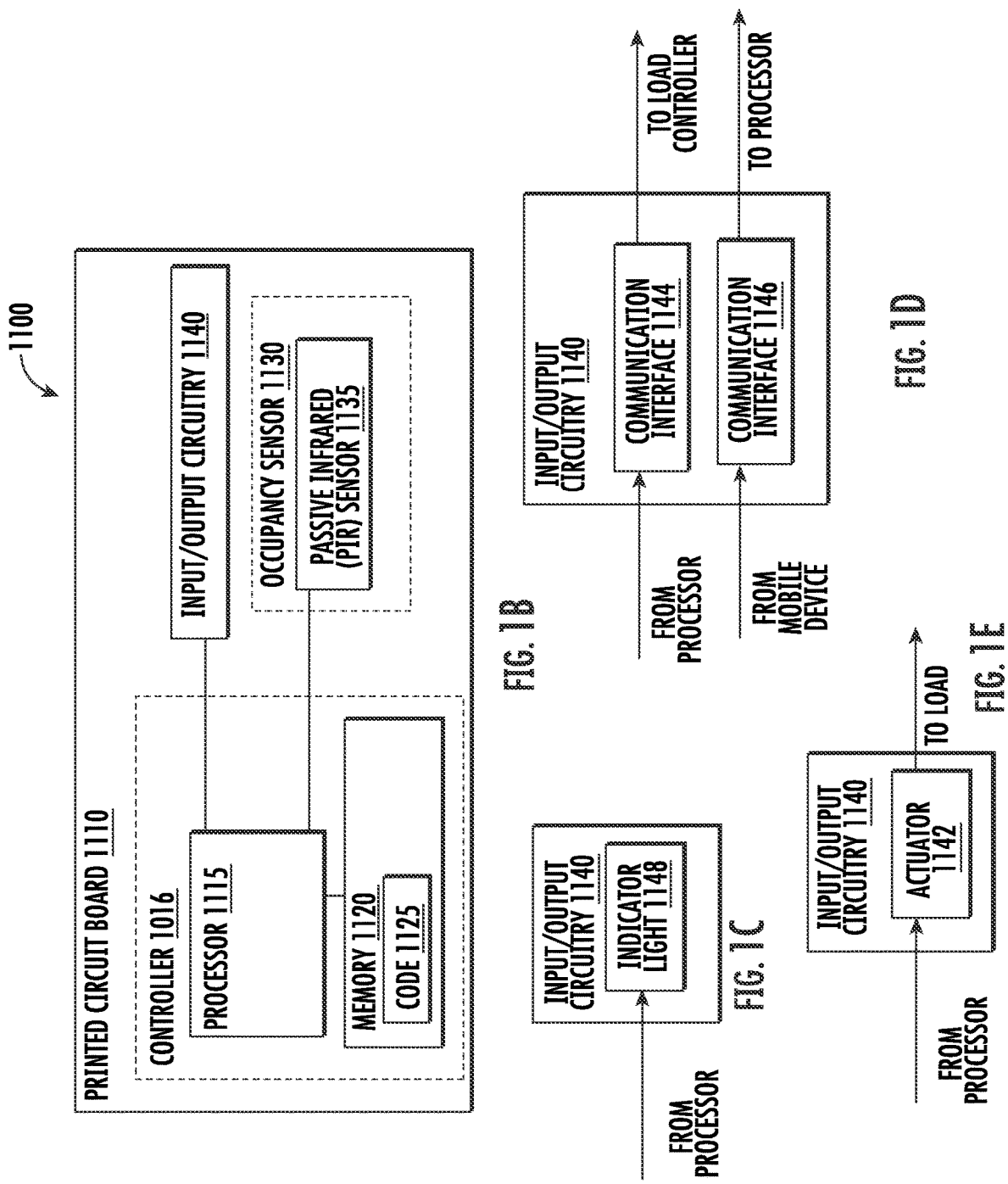

METHODS AND ARRANGEMENTS FOR FALSE TRIGGER PREVENTION

CROSS-REFERENCE TO RELATED APPLICATIONS

This application is a non-provisional application claiming priority to U.S. provisional patent application No. 63/105,980, filed Oct. 27, 2020, entitled "METHODS AND ARRANGEMENTS FOR FALSE TRIGGER PREVENTION", which is hereby incorporated by reference into the present application in its entirety.

FIELD OF THE DISCLOSURE

The present disclosure relates generally to occupancy sensors and, more particularly, to circuitry and/or code to prevent a false trigger by an occupancy sensor responsive to a disturbance at the occupancy sensor such as vibration, electromagnetic noise, or thermal disturbance.

BACKGROUND OF THE DISCLOSURE

Occupancy sensors that can operate as load controls, security devices, and/or the like. For instance, occupancy sensors may detect movement within a space in or around a building and responsively power one or more lights. Occupancy sensors may also or alternatively communicate with a processing system such as security system to indicate movement in or around spaces within or around a building.

Occupancy sensors can reduce power consumption of various loads that do not require power when a space is not occupied. For instance, some occupancy sensors are passive sensors that are low power devices that can form an electric charge from detection of motion such as some passive infrared (PIR) sensors. A PIR sensor may include, e.g., a pyroelectric sensor, a thermopile infrared sensor, or the like to detect changes in infrared radiation within a certain space or area about the PIR sensor.

Depending on the construction of an occupancy sensor, the occupancy sensor may be susceptible to false detections of motion. False detections may, for instance, erroneously and undesirably turn on a load when there is no occupant in a space or output a false indication of motion of an occupant in a space.

SUMMARY OF THE INVENTION

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Some embodiments include an occupancy sensor device. The occupancy sensor device, comprising a sensor configured to output a detection signal, the detection signal including one or more pulses, the one or more pulses comprising one or more characteristics indicative of either detection of a motion or detection of a disturbance; and a controller coupled with the sensor to receive the detection signal, the controller programmed to compare the one or more characteristics of the one or more pulses against a predetermined characteristic threshold, and based on the comparison, determine whether the one or more pulses indicate detection of the motion or detection of the disturbance.

Further embodiments include an occupancy sensor device. The occupancy sensor device, comprising an occupancy sensor to output a detection signal, the detection signal including one or more pulses comprising one or more characteristics indicative of either detection of a motion or a false trigger responsive to a vibration; a vibration sensor to output a signal responsive to a vibration of the sensor; a controller coupled with the vibration sensor to detect a vibration and coupled with the occupancy sensor to determine if an output from the occupancy sensor of one or more pulses indicates detection of motion or indicates a false trigger responsive to vibration; to determine that the output from the occupancy sensor of one or more pulses indicates detection of motion in the absence of a corresponding signal from the vibration sensor; and to output an indication of motion in response to a determination that the one or more pulses indicate detection of motion by the occupancy sensor.

Other embodiments include a non-transitory computer-readable medium comprising computer-readable code, the computer-readable code, when executed by a processor, to perform operations. The operations may compare one or more characteristics of one or more pulses from a sensor against a predetermined characteristic threshold; determine, based on the comparison, whether the one or more pulses indicate detection of motion or are responsive to vibration; and output an indication of detection of motion in response to a determination that the one or more pulses indicate detection of motion.

BRIEF DESCRIPTION OF THE DRAWINGS

By way of example, specific embodiments of the disclosed device will now be described, with reference to the accompanying drawings, in which:

FIG. 1B illustrates an embodiment of an occupancy sensor device such as the occupancy sensor device shown in FIG. 1A;

FIG. 1C illustrates an embodiment of an actuator circuit to couple with the output of the system in FIG. 1B;

FIG. 1D illustrates an embodiment of a wireless communications circuit to couple with the output and/or input of the system in FIG. 1B;

FIG. 1E illustrates an embodiment of an indicator to couple with the output of the system in FIG. 1B;

FIG. 1H illustrates an embodiment of an output signal from a passive infrared (PIR) sensor for motion detection such as the sensor in the system in FIG. 1B;

FIG. 1I illustrates an embodiment of an output signal from a passive infrared (PIR) sensor for vibrations associated with a mechanical impact such as the sensor in the system in FIG. 1B;

FIG. 1J illustrates another embodiment of an output signal from a passive infrared (PIR) sensor for vibrations associated with a mechanical impact such as the sensor in the system in FIG. 1B;

DETAILED DESCRIPTION

Figure 1A:
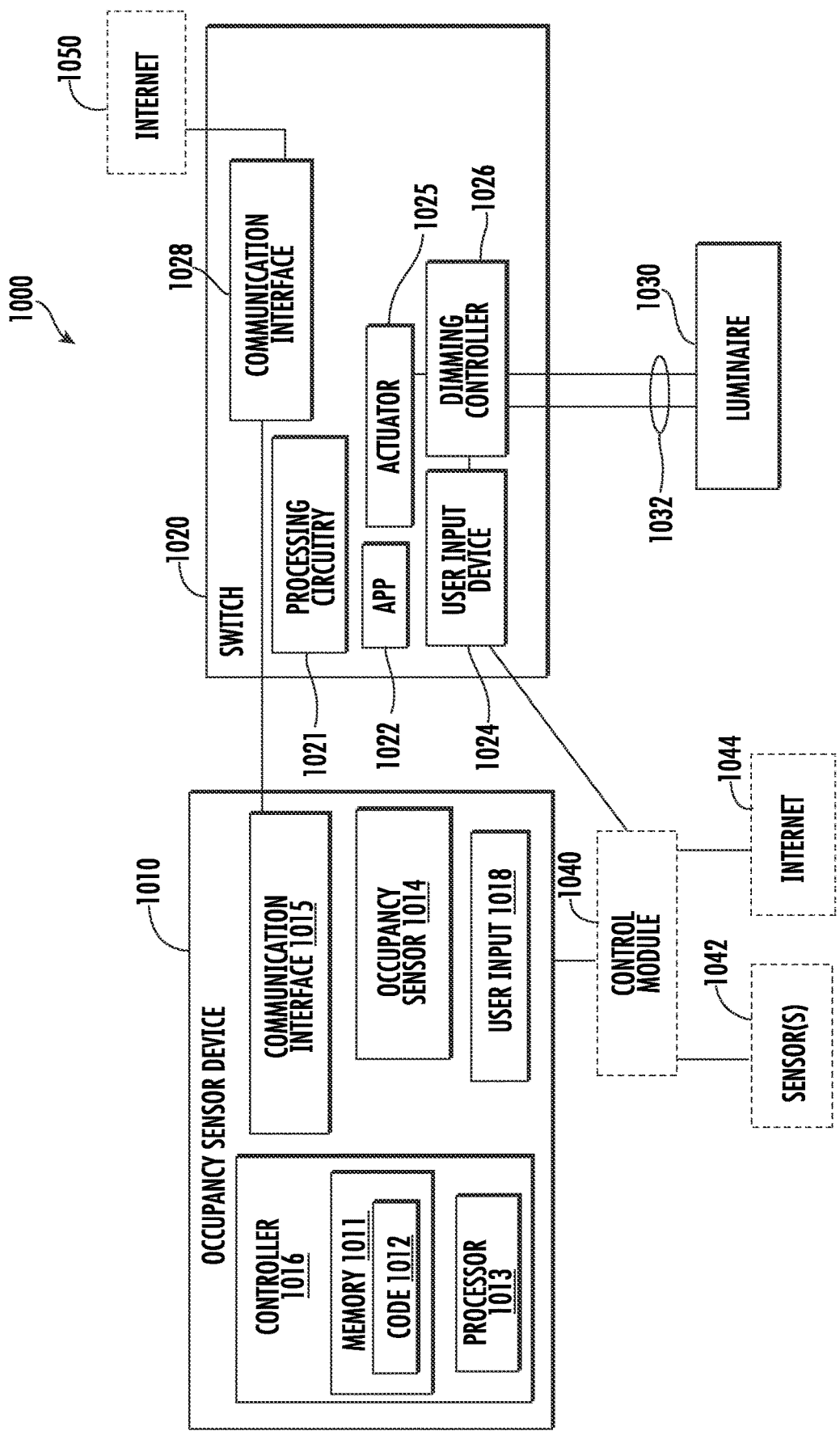
FIG. 1A illustrates an embodiment of a system including an occupancy sensor device coupled with a smart switch.

Devices, systems, and methods in accordance with the present disclosure will now be described more fully hereinafter with reference to the accompanying drawings, in which preferred embodiments of the devices, systems, and methods are shown. The disclosed devices, systems, and method, however, may be embodied in many different forms and should not be construed as being limited to the embodiments set forth herein. Rather, these embodiments are provided so that this disclosure will be thorough and complete, and will fully convey the scope of the devices, systems, and methods to those skilled in the art. In the drawings, like numbers refer to like elements throughout.

Depending on their design, occupancy sensors may be susceptible to false triggers in response to environmental conditions, or disturbances, other than detection of changes in infrared radiation. For instance, passive infrared (PIR) sensors are typically housed in metallic packages to insulate the sensitive element from thermal disturbances and electromagnetic noise. Some digital PIR sensors include circuitry or other elements that are susceptible to vibrations such as vibrations caused by a mechanical impact. In particular, in response to mechanical vibrations such as a door slam or vibrations from opening or closing a garage door, some digital PIR sensors generate an output similar to some outputs generated by the same digital PIR sensor in response to motion detection. However, the outputs responsive to motion detection are more random and typically have characteristics that are distinguishable from characteristics of the disturbances caused by disturbances such as mechanical impacts.

Embodiments disclosed herein include a controller to distinguish output signals from an occupancy sensor as output signals generated in response to motion detection and output signals generated in response to disturbances such as vibrations. In some embodiments, the output signals from an occupancy sensor are monitored and/or sampled to determine one or more characteristics of the output signal. For instance, some embodiments may execute code stored in memory with processing circuitry of the controller to determine one or more characteristics of the output signal. Based on comparison of the one or more characteristics against one or more different thresholds that represent differences in output signals, such embodiments may distinguish between output signals that indicate detection of motion and output signals that are responsive to vibration.

In some embodiments, the one or more characteristics of the output signal from the occupancy sensor include characteristics of one or more pulses in the output signals. Some embodiments may, for example, determine a magnitude the two or more consecutive pulses to determine if the magnitude of the two or more consecutive pulses exceed a pulse threshold.

Further embodiments may determine a rate of change or slope of a rising or falling edge of a first pulse to determine if the rate of change is less than a rate of change threshold. If the rate of change of the first pulse is less than the rate of change threshold, such embodiments determine that the output signal from the occupancy sensor represents motion detection. On the other hand, if the rate of change of the first pulse exceeds the rate of change threshold, such embodiments determine that the output signal from the occupancy sensor represents a false trigger.

Still further embodiments, the may determine a pulse-width of a first pulse in the output signal from the occupancy sensor to determine if the pulse-width exceeds a pulse-width threshold. If the pulse-width of the first pulse exceeds the pulse-width threshold, such embodiments determine that the output signal from the occupancy sensor represents motion detection. On the other hand, if the pulse-width is less than the pulse-width threshold, such embodiments determine that the output signal from the occupancy sensor represents a false trigger.

Other embodiments implement a vibration sensor in addition to the occupancy sensor to distinguish between output signals that indicate detection of motion and output signals that are responsive to vibration. In such embodiments, the controller may determine whether an output signal from a vibration sensor corresponds with an output signal from an occupancy sensor to determine whether the output signals indicate detection of motion or the output signals are responsive to vibration. For instance, if the vibration sensor outputs a signal that corresponds to the output signal from the occupancy sensor, the controller may determine that the output from the occupancy sensor is a false trigger. On the other hand, if no output signal from the vibration sensor corresponds to the output signal from the occupancy sensor, the output signal from the occupancy sensor may indicate detection of motion.

In many embodiments, when an output from the occupancy sensor is determined to be a false trigger, the output signal is ignored. In other embodiments, when an output from the occupancy sensor is determined to be a false trigger, the occupancy sensor device may output an indication that the occupancy sensor output a false trigger by, e.g., powering an indicator light or other visible indicator. In further embodiments, when an output from the occupancy sensor is determined to be a false trigger, the occupancy sensor device may cause the wireless transmission of a packet to indicate that the occupancy sensor output a false trigger.

Some embodiments include standalone occupancy sensor systems. Such systems may be configured to connect with a switch through conductors or through a wireless connection. In some embodiments, the wireless connection may include, for instance, a Wi-Fi communications protocol, a Bluetooth communications protocol, a ZigBee communications protocol, a Z-Wave communications protocol; and a cellular communications protocol.

Several embodiments communicate via one or more wireless communication protocols such as Bluetooth or Bluetooth Low Energy in accordance with, e.g., the Bluetooth Core Specification v5.0 published Dec. 6, 2016, Bluetooth Mesh, Near Field Communication, Zigbee or Z-wave, one or more cellular communication standards such as one or more 3rd Generation Partnership Project (3GPP), 3GPP Long Term Evolution (LTE), 3GPP LTE-Advanced (LTE-A), 4G LTE, and/or 5G New Radio (NR), technologies and/or standards, one or more infrared communication protocols, etc. Further embodiments implement one or more Institute of Electrical and Electronics Engineers (IEEE) 802.11 standards (sometimes collectively referred to as "Wi-Fi"). Such standards may include, for instance, the IEEE 802.11-2016, published Dec. 14, 2016, and the IEEE 802.11ah-2016, published May 5, 2017. Some embodiments implement the IEEE standards in accordance with a Wi-Fi Alliance specification such as the Wi-Fi Peer-to-Peer (P2P) technical specification version 1.7, published Jul. 6, 2016. Some embodiments implement a combination of one or more protocols of one or more of the standards and/or specifications. The embodiments are not limited to these standards and specifications.

Some embodiments include an occupancy sensor that is integrated with an actuator such as one or more a switches, relays, power transistors, or the like. In such embodiments, the occupancy sensor may couple with the same printed circuit board (PCB) as the actuator. In some embodiments, the PCB with the occupancy sensor may be contained in a housing such as a light switch housing that is adapted for installation at least partially in and attached to an electrical junction box. In some embodiments, the actuator may turn on or power the luminaire, e.g., by activating a coil in a relay of the ballast or by activating a channel of a power transistor in the ballast of the luminaire. The actuator may turn off the luminaire, e.g., by deactivating a coil in a relay of the ballast or by deactivating a channel of a power transistor of the ballast of the luminaire.

FIG. 1A illustrates an embodiment of a system 1000 including an occupancy sensor device 1010, a smart switch 1020 coupled with a luminaire 1030 and an optional control module 1040. The occupancy sensor device 1010 may be a processor-based device that includes an occupancy sensor 1014 and other circuitry to prevent or attenuate the occurrence of false triggers, or false detections. In the present embodiment, the controller 1016 of the occupancy sensor device 1010 may include logic circuitry such as memory 1011 and a processor 1013 to execute code 1012 in the memory 1011. In other embodiments, the logic circuitry may include circuitry such as state machines, logic gates, application specific integrated circuits (ASICs), field programmable gate arrays (FPGAs), other circuitry, or the like. The controller 1016 may be programmed or otherwise configured to determine whether an output from the occupancy sensor 1014 relates to a detection of motion or relates to a false trigger responsive to other environmental factors. For instance, the occupancy sensor 1014 may comprise a digital passive infrared (PIR) sensor that generates an output in response to vibrations from a mechanical impact that is similar to the output generated by the PIR sensor in response to motion.

The mechanical impact can refer to various occurrences that cause vibrations or other disturbances at the occupancy sensor 1014. For instance, a mechanical impact may result from slamming a door in the vicinity of the occupancy sensor 1014, closing a garage door in the vicinity of the occupancy sensor 1014, or the like. The mechanical impact may also include an impact on a wall or roof of a building by an object or other that causes vibrations at the occupancy sensor 1014. Furthermore, other disturbances such as storms causing thunder, lightning, and/or thermal disturbances in the area of the installation of the occupancy sensor 1014 may cause vibrations, electromagnetic disturbances, thermal disturbances, or the like that might cause a false trigger by the occupancy sensor 1014. FIGS. 1I and 1J illustrate embodiments 1500 and 1600 of outputs from a digital PIR sensor that are caused by mechanical impacts.

The occupancy sensor device 1010 may have multiple preset threshold settings to adjust the sensitivity of the occupancy sensor device 1010. The preset threshold settings may include predetermined characteristic thresholds for one or more of a pulse threshold, a rate of change threshold, and a pulse-width threshold, which may depend on the predetermined characteristic thresholds implemented by the occupancy sensor device 1010. In some embodiments, the occupancy sensor device 1010 may comprise a user input 1018 such as a switch or a slide bar to allow a user to physically select a sensitivity of the occupancy sensor device 1010. Setting the sensitivity may select or adjust one or more predetermined characteristic thresholds designated for analyzing the output signal of the occupancy sensor 1014. For instance, in some embodiments, the controller 1016 may include a predetermined characteristic threshold and may be programmed to compare the predetermined characteristic threshold against a magnitude of the output signal. If the magnitude of the amplitudes of the first pulse and the second pulse both exceed the threshold, the output signal may represent a detection event of motion by the occupancy sensor 1014. On the other hand, if the magnitude of the amplitude of the first pulse and/or the magnitude of the amplitude the second pulse are less than the threshold, the output signal may represent a false trigger by the occupancy sensor 1014. In other embodiments, the controller 1016 may be programmed to compare a first threshold against the first pulse and a second threshold against the second pulse or subsequent pulses.

Further embodiments may include a predetermined characteristic threshold to compare against a pulse-width of the first pulse in the output signal of the occupancy sensor 1014 and/or a threshold to compare against a rate of change, or slope, of a rising edge or falling edge of the first pulse in the output signal from the occupancy sensor 1014. In some embodiments, the occupancy sensor device 1010 may determine a combination of two or more of the characteristics of the output signal from the occupancy sensor 1014 such as whether the magnitudes of the amplitudes of the first and second pulses exceed (are greater than) a first threshold, whether the rate of change of the rising edge or falling edge of the slope of the first pulse is less than a second threshold, and/or whether the pulse-width of the first pulse exceeds a third threshold.

For embodiments that use more than one threshold, the switch or slide bar may adjust the selection of all the thresholds individually or as a group. To illustrate, the switch may change the sensitivity of the occupancy sensor 1014 between three, preset or factory set sensitivity levels for each of the thresholds. In such embodiments, the lowest sensitivity setting may be associated with two or more thresholds to set the lowest sensitivity for determining whether the occupancy sensor 1014 output is responsive to motion detection or is a false trigger. The highest sensitivity setting may be associated with two or more thresholds to set the highest sensitivity for determining whether the occupancy sensor 1014 output is responsive to motion detection or is a false trigger. And the third sensitivity setting may be associated with two or more thresholds to set a mid-level sensitivity for determining whether the occupancy sensor 1014 output is responsive to motion detection or is a false trigger.

The occupancy sensor device 1010 may also comprise a communication interface 1014 to communicate an indication of a motion to the switch 1020. In some embodiments, the communication interface 1015 may comprise connection points to interconnect the occupancy sensor device 1010 with the communication interface 1028 of the switch 1020. In such embodiments, the occupancy sensor device 1010 may reside on a separate printed circuit board (PCB) from the components of the switch 1020 and may physically connect to the PCB of the switch 1020 via one or more circuit board connectors and/or conductors. In other embodiments, the occupancy sensor device 1010 may reside on the same printed circuit board (PCB) as one or more of the components of the switch 1020.

In further embodiments, the communication interface 1014 comprises a wireless communications interface capable of wirelessly communicating with the communications interface 1028 of the switch 1020 via one or more wireless communication protocols such as Bluetooth, Wi-Fi, ZigBee, Z-Wave, or the like. In some embodiments, the communication interface 1014 comprises a wireless communications interface capable of wirelessly communicating with a communications interface of a mobile device or other computer via one or more wireless communication protocols such as Bluetooth, Wi-Fi, 4G, LTE, 5G, and/or the like. In such embodiments, the mobile device may set the sensitivity of the occupancy sensor device 1010 remotely via an application executing on the mobile device such as an application with the user interface described in conjunction with FIG. 1F.

In some embodiments, the occupancy sensor device 1010 may comprise a system-on-a-chip (SoC) or a chip package with multiple integrated circuits. In other embodiments, one or more of the memory 1011 storing the code 1012, occupancy sensor device 1014, the communication interface 1015, and the controller 1016 may reside in distinct chips and be interconnected via one or more circuit boards and/or conductors.

In other embodiments, the communications interface 1014 may communicate with a control module 1040 and the control module 1040 may communicate with the communications interface 1028 of the switch 1020 via a wired or wireless communication protocol. The control module 1040 may be, e.g., a hub, a gateway, a site controller, a combination thereof, or the like. For example, occupancy sensor device 1014 may generate an output signal responsive to motion detection and communicate the indication to the control module 1040. The control module 1040 may respond by instructing the switch 1020 to apply power to the load connected to the switch 1020 such as the luminaire 1030.

The switch 1020 may comprise an actuator 1025 to receive physical input from a user to connect or disconnect power from the luminaire 1030. In some embodiments, the actuator 1025 may disconnect power from the dimming controller 1026. In other embodiments, the actuator 1025 may provide an input to the dimming controller 1026 that reduces the duty cycle of the output signals 1032 to zero percent or otherwise reduces the power to the luminaire 1030 to effectively turn off the luminaire 1030.

In some embodiments, the user input device 1024 may comprise a rocker switch or slide switch to control dimming of the luminaire 1030 via the dimming controller 1026. The user may press the upper portion of the rocker switch or slide the slide switch to instruct to the dimming controller 1026 to adjust a first attribute of the load by increasing the intensity level of the light generated by the luminaire 1030. The user may press the lower portion of the rocker switch to instruct the dimming controller 1026 to adjust a second attribute of the load by decreasing the intensity level of the light generated by the luminaire 1030.

The control module 1040 may couple with one or more sensors 1042 and may couple with the Internet 1044. In many embodiments, the application 1022 communicate with the control module 1040 and/or the occupancy sensor device 1010 to receive an indication of a motion detection and determine appropriate changes to the luminaire 1030 in according with settings for the switch 1020. In several embodiments, the control module 1040 may include clock circuitry to maintain a time of day as well as astronomical clock circuitry to adjust and intensity of the luminaire 1030 for local sunrise and sunset times. For embodiments with access to the Internet, the control module 1040 may periodically update or verify the accuracy of the clock circuitry and/or the astronomical clock circuitry.

The switch 1020 may be an electrical device to generate control signals 1032 based on a user input via the user input device 1024 to control an attribute of a load such as the luminaire 1030. The switch 1020 may comprise an application 1022 for execution on processing circuitry 1021 of the switch 1020, a user input device 1024, a dimming controller 1026, and a communications interface 1028. The switch 1020 may interact with the occupancy sensor device 1010 directly via the communication interface 1028 or indirectly via the communication interface 1028 and the control module 1040 depending on the configuration of the system 1000.

The control signals 1032 may be any type of signals that can communicate values for the intensity level and the color temperature to the luminaire 1030 or a ballast for the luminaire 1030. In some embodiments, the control signals 1032 comprise pulse-width modulation (PWM) control signals. In many embodiments, the control signals 1032 may cycle the luminaire on and off in accordance with the duty cycle to establish the intensity level of light and/color temperature emitted from the luminaire 1030 via, e.g., a relay and/or power transistor in the switch 1020 or in the luminaire 1030 or a ballast for the luminaire 1030. For example, in response to detection of motion by the occupancy sensor device 1010 in a hallway of a building, the occupancy sensor device 1010 may output an indication of the detection of motion to the communication interface 1028 of the switch 1020 associated with the hallway. The processing circuitry 1021 may execute the application 1022 to determine to turn on the luminaire 1030 or adjust the intensity and/or color temperature of the luminaire 1030 in response to the detection of motion in the hallway.

The communication interface 1028 may facilitate communication with the communication interface 1014 of the processing device 1010 or a communication interface of the control module 1040 via any known wireless communication standard or protocol. Example wireless protocols may include, for example, Wi-Fi (e.g., any IEEE 802.11 a/b/g/n network); a Personal Area Network (PAN) such as Bluetooth, Bluetooth Low Energy, or Bluetooth Mesh; Near Field Communication; a mesh network such as Zigbee or Z-wave; any cellular communication standard; any infrared communication protocol; etc. The communication interfaces 1014 and 1028 may include one or more transceivers to accommodate wireless communication with devices and, possibly cloud service platforms, over a variety of wireless communication standards or protocols. In some embodiments, the communication interfaces 1014 and 1028 may comprise an antenna such as an array of antenna elements and, in other embodiments, the communication interfaces 1014 and 1028 may couple with an antenna such as an array of antenna elements.

The processing device 1010, the switch 1020, and the control module 1040 may communicate wirelessly over any frequency within any licensed or unlicensed frequency band (e.g., over a 2.4 GHz operating frequency band or a 5 GHz operating frequency band). The system 1000 may implement any known security or encryption protocol or standard such as, for example, WPA or WPA2, to communicate, either directly or indirectly, with other devices over a wireless connection and/or through one or more intermediate devices (such as, for example, a cellular base station, a Wi-Fi router, a cloud service platform, etc.).

FIG. 1B illustrates an embodiment of an occupancy sensor device 1100 on a PCB 1110 such as the occupancy sensor device 1010 shown in FIG. 1A. The PCB 1110 may comprise circuitry and/or conductors interconnecting the controller 1016, an occupancy sensor 1130, and input/output (I/O) circuitry 1140.

The controller 1016 may include a processor 1115 and supporting circuitry for the processor 1115 such as a clock circuit, one or more voltage supplies at one or more voltages, gates, buffers, amplifiers, and/or the like. The processor 1115 may also comprise a memory coupled with the processor 1115 and the memory may comprise code 1125 to distinguish motion detection from false triggers. The processor 1115 may execute code such as the code 1125 in the memory 1120.

During execution of the code 1125, the processor 1115 may place the occupancy sensor device 1100 into a low power mode until first detection of an output signal from the occupancy sensor 1130. If the output signal has a characteristic of a detection of motion, the processor 1115 may execute the corresponding code 1125 to return the occupancy sensor device 1100 to a normal power level. For instance, after the processor 1115 detects that a magnitude of the amplitude of the output signal from the occupancy sensor 1130 exceeds a predetermined characteristic threshold, the processor 1115 may wake the occupancy sensor device 1100 to a normal power mode.

The occupancy sensor 1130 may comprise a PIR sensor 1135 such as a digital PIR sensor. The PIR sensor 1135 may generate false triggers in response to vibration such as vibration of the PIR sensor 1135 that results from a mechanical impact like a door slam or a garage door.

The occupancy sensor device 1100 may distinguish false triggers by comparing the magnitude of the amplitude of the first pulse and the second pulse of the output signal from the occupancy sensor 1130 to a predetermined characteristic threshold of, e.g., 8. See, for instance FIGS. 1I and 1J.

FIG. 1I illustrates an embodiment 1500 of an output signal from a passive infrared (PIR) sensor for vibrations associated with a mechanical impact such as the PIR sensor 1135 in the system in FIG. 1B. Note that the peak magnitude of the first pulse 1510 is about 13 and the magnitude of the second pulse 1520 is about 6. The processor 1115 may monitor the output from the PIR sensor 1135 until the detection of a magnitude that exceeds the predetermined characteristic threshold of 8 and, in response, some embodiments wake a portion of the occupancy sensor device 1100 from a sleep mode, or low power mode, to an awake mode, or normal power mode. In some embodiments, the processor 1115 may detect the magnitude, or absolute value, of the amplitude of −13 that exceeds the predetermined characteristic threshold of 8 on a rising edge of the magnitude of the first pulse 1510 or falling edge of the amplitude of the first pulse 1510. Other embodiments may determine the magnitude of the amplitude of the first pulse 1510 at the peak of the first pulse or at the falling edge of the magnitude of the amplitude of the first pulse 1510. Note that the falling edge of the magnitude of the amplitude of the first pulse 1510 is the rising edge of the amplitude of the first pulse 1510.

FIG. 1J illustrates another embodiment 1600 of an output signal from a passive infrared (PIR) sensor for vibrations associated with a mechanical impact such as the PIR sensor 1135 in the system in FIG. 1B. Note that the peak magnitude of the first pulse 1610 is about 10 and the peak magnitude of the second pulse 1620 is about 6. The processor 1115 may monitor the output from the PIR sensor 1135 until the detection of a magnitude that exceeds the predetermined characteristic threshold of 8 and, in response, wake a portion of the occupancy sensor device 1100 from a low power mode to a normal power mode. In some embodiments, the processor 1115 may detect a magnitude of the amplitude of −13 that exceeds the predetermined characteristic threshold of 8 on a rising edge 1612 of the magnitude of the first pulse 1610. Other embodiments may determine the magnitude of the amplitude of the first pulse 1610 at the peak of the first pulse or at the falling edge 1614 of the magnitude of the amplitude of the first pulse 1610. Note that the falling edge of the magnitude of the amplitude of the first pulse 1610 is the rising edge of the amplitude of the first pulse 1610. Note also the selection of the predetermined characteristic threshold, in some embodiments, may be dependent on the design of the occupancy sensor device, the occupancy sensor, intended installation location, and/or the like. Note also that the predetermined characteristic threshold may be selectable by a manufacturer and/or a user either wirelessly, via a switch or slide bar, via a setting, and/or the like.

In further embodiments, the code 1125 may cause the processor 1115 determine the slope or rate of change of the rising or falling edge of the first pulse 1610 (or the rising or falling edge of the magnitude of the first pulse 1610). In such embodiments, the processor 1115 may sample the falling edge 1612 (rising edge of the magnitude of the first pulse 1610) or the rising edge 1614 (falling edge of the magnitude of the first pulse 1610) to determine the rate of change of the corresponding edge. The processor 1115 may compare the rate of change to a predetermined characteristic threshold for the rate of change to determine if the rate of change of the edge of the first pulse is less than the threshold. When the rate of change of the edge of the first pulse is less than a predetermined characteristic threshold rate of change, the processor 1115 may determine that the output signal represents a detection of motion and does not represent a false trigger. In response, the processor 1115 may include a pin output or other output to output an indication (also referred to as a characterized detection signal) that the occupancy sensor detected motion.

The input/output circuitry may include a controllably conductive device coupled with the controller 1016 or with the processor 1115 of the controller 1016 to output an indication (also referred to as a characterized detection signal) of a detection of motion by the occupancy sensor 1130 and/or detection of a false trigger by the occupancy sensor 1130. The controllably conductive device may comprise circuitry such as a latch, a buffer, a transistor, a relay, a power relay, a flip-flop integrated circuit, a multiplexer, a switch, a delay circuit, a wireless communications interface, a wired communications interface, other associated circuitry, and/or the like. Furthermore, the controllably conductive device arranged and configured to selectively control the ON/OFF state of an electrical load in response to the detected motion.

In still further embodiments, the processor 1115 may execute the code 1125 to determine the pulse-width 1616 of the first pulse 1610. If the pulse-width 1616 of the first pulse 1610 exceeds a threshold pulse-width, the processor 1115 may determine that the output signal indicates a detection of motion by the PIR sensor 1135.

In some embodiments, the occupancy sensor device 1100 may combine the results of threshold comparisons of the magnitude of the amplitudes of the first and second pulses 1610 and 1620, the rate of change of an edge (1612 or 1614) of the first pulse 1610, and the pulse-width 1616 of the first pulse 1610 to determine whether the output signal from the PIR sensor 1135 indicates a false trigger or a detection of motion. In some embodiments, the results are combined with a logical OR operation such that any determination of a false trigger results in identification of the output as a false trigger. In some embodiments, the results are combined with a logical OR operation such that any determination that the output represents a detection of motion results in identification of the output as a detection of motion. In some embodiments, the results are combined with a logical AND operation such that any determination that the output represents a detection of motion results in identification of the output as a detection of motion. In some embodiments, the results are combined with a logical AND operation such that any determination that the output represents a false trigger results in identification of the output as a false trigger. And in some embodiments, the results are combined to determine the majority vote of the results of the threshold comparisons, or the like.

In response to determining that the peak magnitude of the second pulse 1520 in FIG. 1I (and 1620 in FIG. 1J) does not exceed the threshold value of 8, the processor 1115 may determine that the output signal, embodiments 1500 and 1600, represent false triggers and may ignore the output from the PIR sensor 1135. In other embodiments, the processor 1135 may output a characterized detection signal to the input/output circuitry 1140, to indicate the false trigger. In such embodiments, the input/output circuitry 1140, may output a characterized detection signal to apply power to an indicator light, such as a yellow light emitting diode (LED), to provide a visual indication of the false positive.

FIG. 1C illustrates an example of the input/output circuitry 1140 comprising a visible indicator such as an indicator light 1148, an audible indicator device (not shown), and/or an audible indicator device integrated with the indicator light 1148 to output an audible indicator. In some embodiments, the indicator light may include a single color light, such as red, to provide a visual indication of detection of motion when the output signal from the PIR sensor 1135 is determined by the processor 1115 to be an output signal responsive to detection of motion and is output a characterized detection signal from the controller 1016 and/or the processor 1115. An embodiment 1400 illustrates an output signal from the PIR sensor 1135 in FIG. 1H in response to motion detection. FIG. 1H illustrates an embodiment of an output signal from a passive infrared (PIR) sensor 1135 for motion detection such as the sensor in the system in FIG. 1B. In FIG. 1B, the output signal includes a peak of a first pulse 1410 at a magnitude of about 21 and peak of a second pulse 1420 at a magnitude of about 21, which are both greater than a threshold of, e.g., 8.

The input/output circuitry 1140 may include one or more transistors, buffers, gates, amplifiers, and/or filters in addition to the indicator light 1148 as shown in FIG. 1C, an audible indicator device (not shown), a communication interface 1144 shown in FIG. 1D, a communication interface 1146 shown in FIG. 1D, an actuator 1142 shown in FIG. 1E, and/or a combination thereof.

FIG. 1D illustrates an example of the input/output circuitry 1140 comprising a communication interface 1144 to transmit an indication of the output of the PIR sensor 1135 to a load controller to power a load in response to a determination by the processor 1115 that the output signal from the PIR sensor 1135 indicates detection of motion. The input/output circuitry 1140 may also comprise a communication interface 1146 to receive a transmission from a mobile device or other computer and to pass the information from the transmission to the processor. For instance, the mobile device may transmit a packet including a setting or configuration for the occupancy sensor device 1100 such as a sensitivity setting for the occupancy sensor 1130 and the processor 1115 may store the setting or configuration in an appropriate location in the memory 1120 to implement the setting or configuration.

FIG. 1E illustrates an example of the input/output circuitry 1140 comprising an actuator 1142. In some embodiments, the actuator 1142 may apply power to a load such as a lighting load in response to an output from the processor 1115 indicating that the occupancy sensor 1130 output an indication of the detection of motion.

Figure 1F:
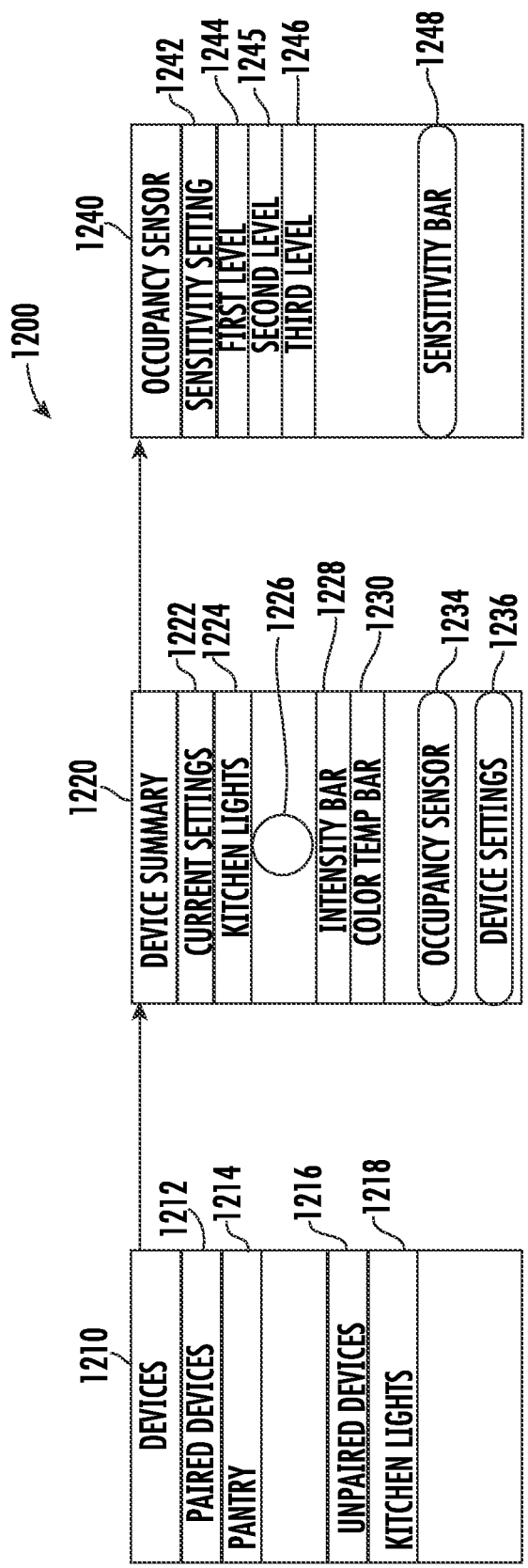
FIG. 1F illustrates an embodiment of a user interface for the system in FIG. 1A.

FIG. 1F illustrates an embodiment of a user interface for a mobile device to set a sensitivity setting for the occupancy sensor 1013 or 1130 as shown in FIGS. 1A-B. The user interface is illustrated as a series of screen shots (devices 1210, device summary 1220, and occupancy sensor 1240) of application executing on processing circuitry of the mobile device or another computing device. The screen shot 1210 may represent a first user interface in the application, may display compatible wireless devices within range of the mobile device, and may include a list of paired devices 1212 and a list of unpaired devices 1216. The list of paired devices 1212 may include a name or identifier for each compatible device, such as the "pantry" device, within the wireless communication range of the processing device. In the present embodiment, a paired device is an electrical device with a Bluetooth wireless communication interface that the user has paired with the application on the processing device. Pairing refers to a basic process to establish communications including an authentication procedure that provides a level of security.

Other embodiments may implement other security protocols. For instance, devices in Bluetooth mesh networks may perform provisioning via a bearer such as an advertising bearer or a Generic Attribute Profile (GATT) bearer rather than pairing to add a device as a node in the mesh network. The process of provisioning also provides a level of security. In the present example, such devices may be referred to as nodes and unprovisioned devices rather than paired and unpaired devices, respectively.

The list of unpaired devices 1216 may list compatible devices or unprovisioned devices that are within wireless communication range of the processing device and have not been provisioned, or "paired" with the processing device. For instance, the "Kitchen Lights" device 1218 may be an electrical device installed in the kitchen that is ready to pair with the processing device.

If the user selects the unpaired "Kitchen Lights" device 1218, the application executing on the processing device may advance to the device summary 1220. The application may communicate with the "Kitchen Lights" device 1218 via a wireless communication interface of the processing device such as the wireless communication interfaces 1015 and 1146 in FIGS. 1A-B to obtain information about the status of the "Kitchen Lights" device 1218.

After obtaining the status of the "Kitchen Lights" device 1218, the application may display the device summary 1220 with an indication of the name of the device "Kitchen Lights" 1228, and an indication regarding whether the "Kitchen Lights" device 1218 are powered on or are powered off 1226. The application may display an indication of the intensity level of lights coupled with the "Kitchen Lights" device 1218 via, e.g., an intensity bar 1228; and an indication of the color temperature of lights coupled with the "Kitchen Lights" device 1218 via, e.g., a color temperature bar 1230 via a user input device such as the user input device 1024 in FIG. 1A.

In many embodiments, the user may press the powered on or powered off indication 1226 to engage the actuator 1025 and 1142 in FIGS. 1A-C to change the status of the lights, i.e., turn on or off the lights. Furthermore, the user may adjust the intensity level of the lights coupled with the "Kitchen Lights" device 1218 by selecting an intensity level on the intensity bar 1228 and may also change the color temperature by selecting a color temperature on the color temperature bar 1230.

The application may allow the user to adjust occupancy sensor settings 1234 and set device settings 1236. The application may allow the user to set various device settings 1136 in response to selection of the device settings 1236 on the user interface. The device settings may include an ability to turn on or off status information in the application such as the brightness level or intensity level of the light, whether the light is powered on or off, the color temperature of the light, fade rates for turning the light on or off, minimum and maximum intensity levels and/or color temperatures, and/or the like. In a further embodiment, the device settings may include an ability to reset authentication.

The occupancy sensor settings 1240 illustrates an example of a user interface generated by the application to adjust the sensitivity setting for an occupancy sensor coupled with the kitchen lights for the "Kitchen Lights" device 1218. The occupancy sensor settings 1240 includes a list of factory preset sensitivity settings 1242 as well as a sensitivity bar 1248. The factory preset sensitivity settings 1242 include a first level 1244, a second level 1245, and a third level 1246. Each level may represent a different level of sensitivity and each level of sensitivity may represent a set of one or more threshold values. The application may allow the user to select a desired sensitivity level from the factory presets.

In some embodiments, the application may also or alternatively include a sensitivity bar that allows the user to select the sensitivity and threshold(s) for the occupancy sensor associated with the "Kitchen Lights" 1218 with a sliding scale.

Figure 1G:
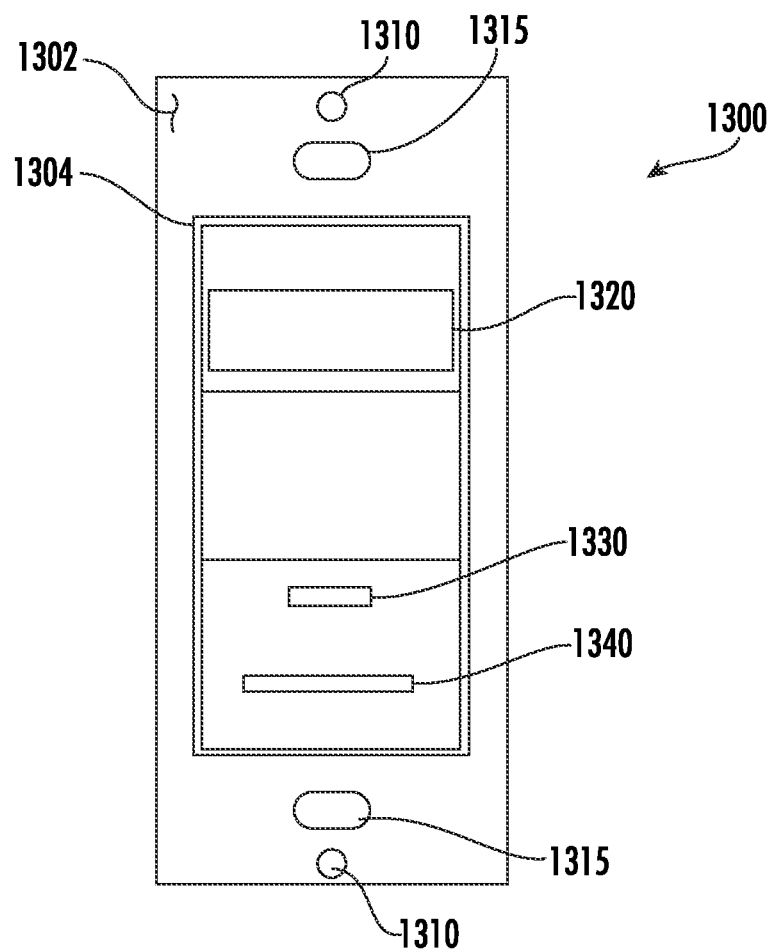
FIG. 1G illustrates an embodiment for the systems in FIGS. 1A-F and FIG. 2.
Figure 14:
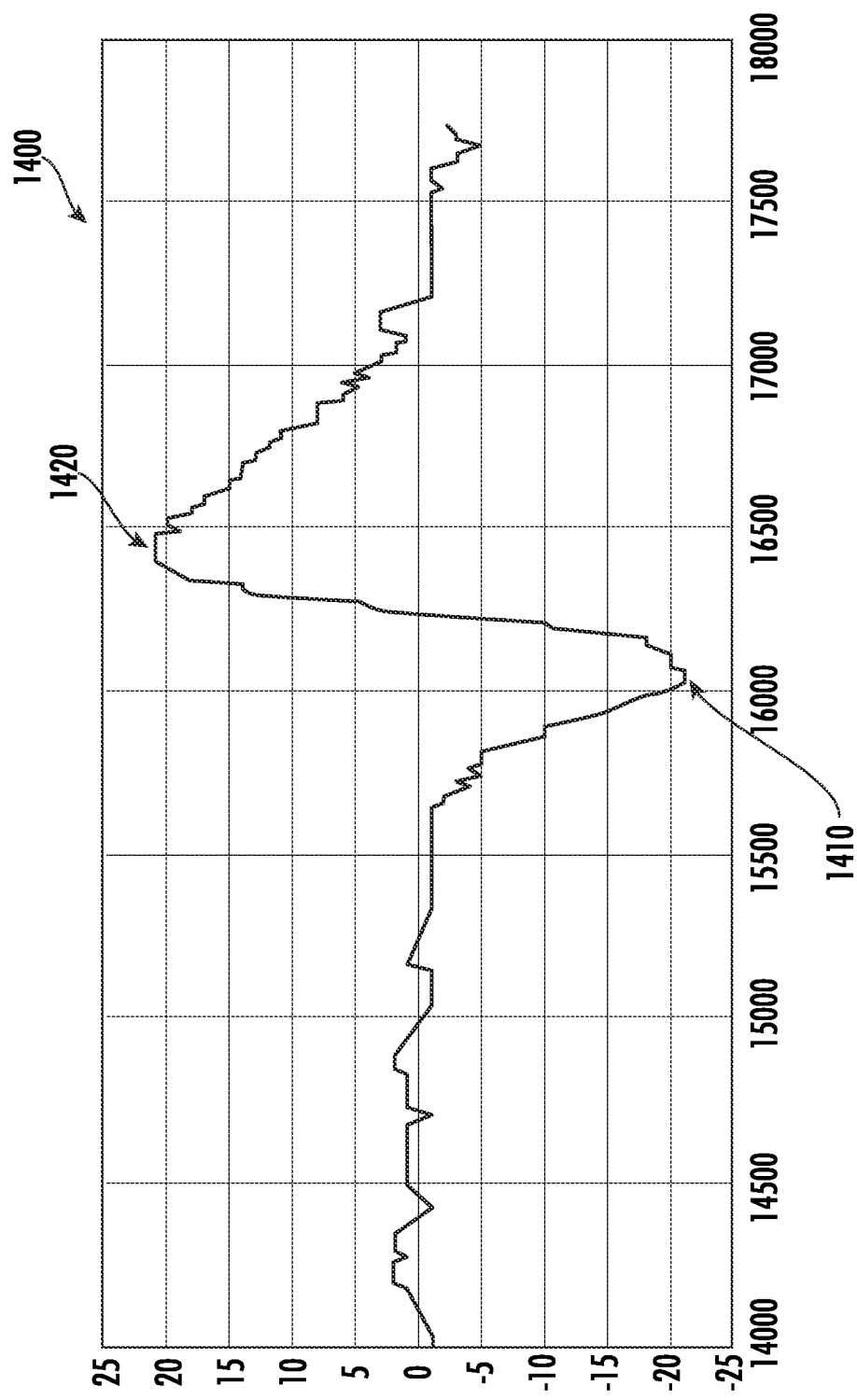
Figure 11:
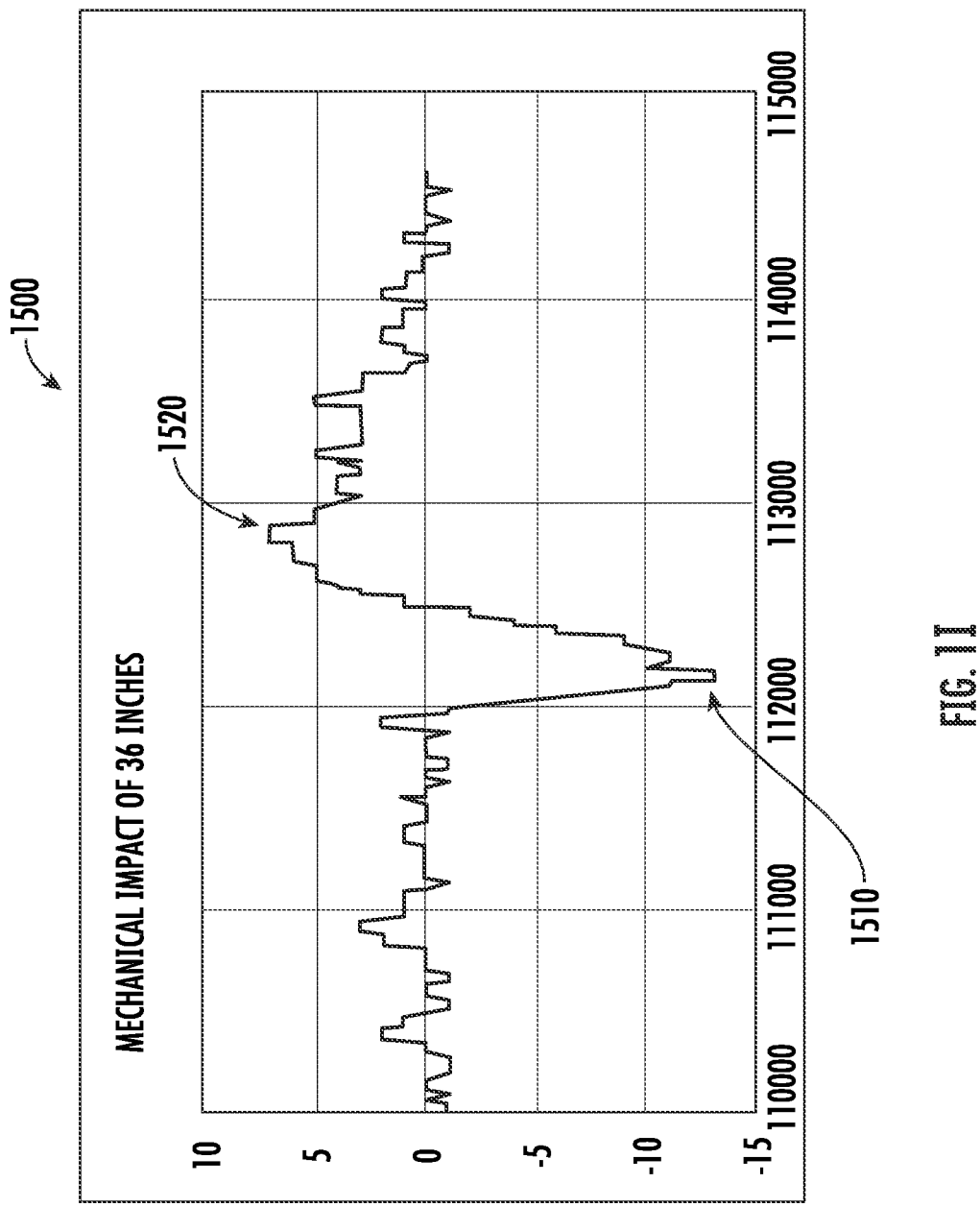
Figure 15:
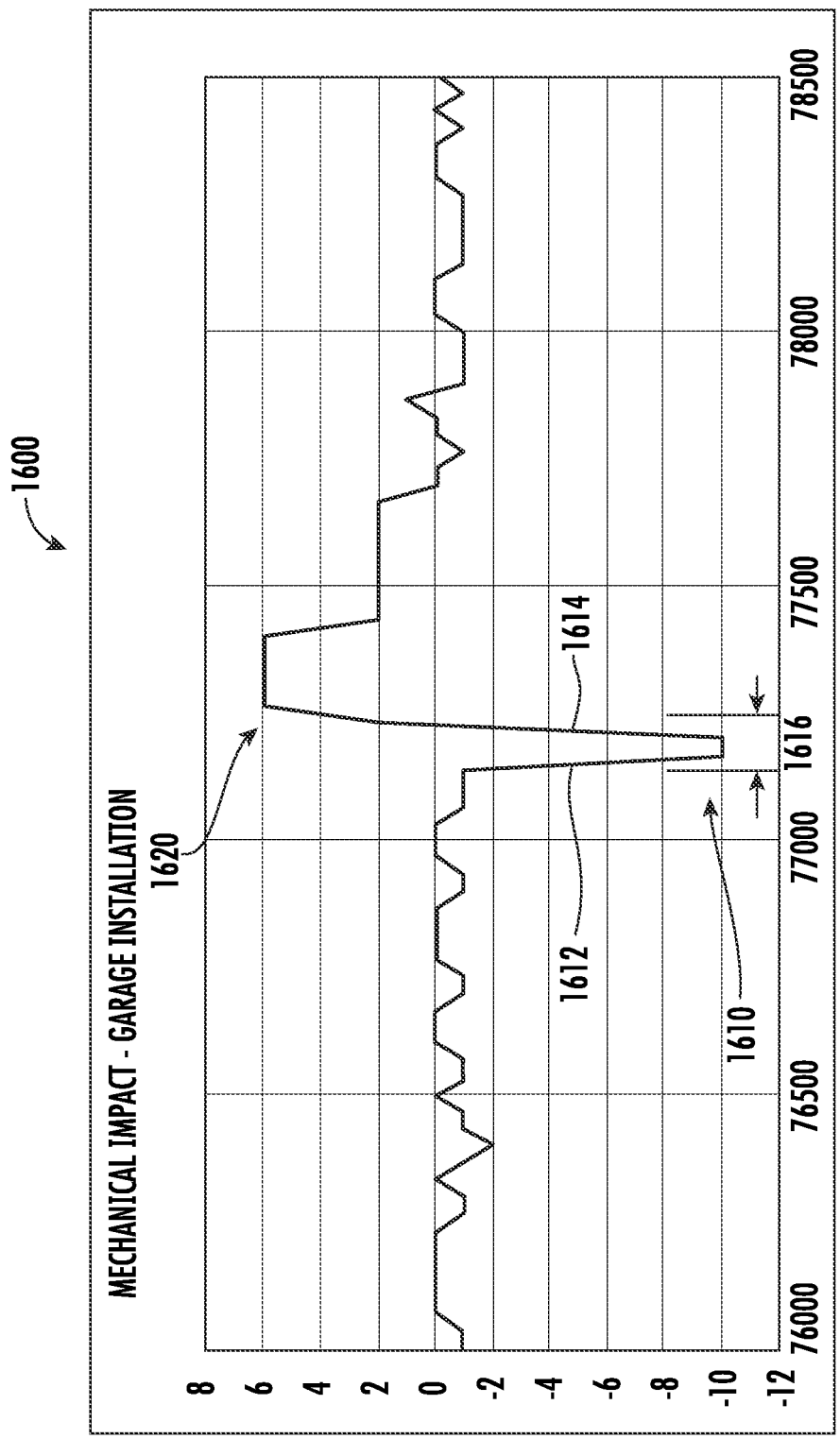

FIG. 1G illustrates an embodiment of a system 1300 for the systems 1000, 1100, and 2000 in FIGS. 1A-F and FIG. 2. The system 1300 includes a mounting plate 1302 to mount the system 1300 to an electrical junction box via openings 1315. The mounting plate 1302 may also include openings 1310 to mount a wall plate over the electrical junction box and mounting plate 1302.

The system 1300 includes a housing 1304 to contain the components and circuitry for a system such as the systems 1000, 1100, and 2000 in FIGS. 1A-F and FIG. 2. The housing 1304 may include a clear or translucent window 1302 for a PIR sensor 1320, a diffuser 1330 for an indicator light such as the indicator light 1148 in FIG. 1C, and a switch 1340 such as the user input 1018 to adjust the sensitivity of the occupancy sensor at the system 1300.

Figure 2:
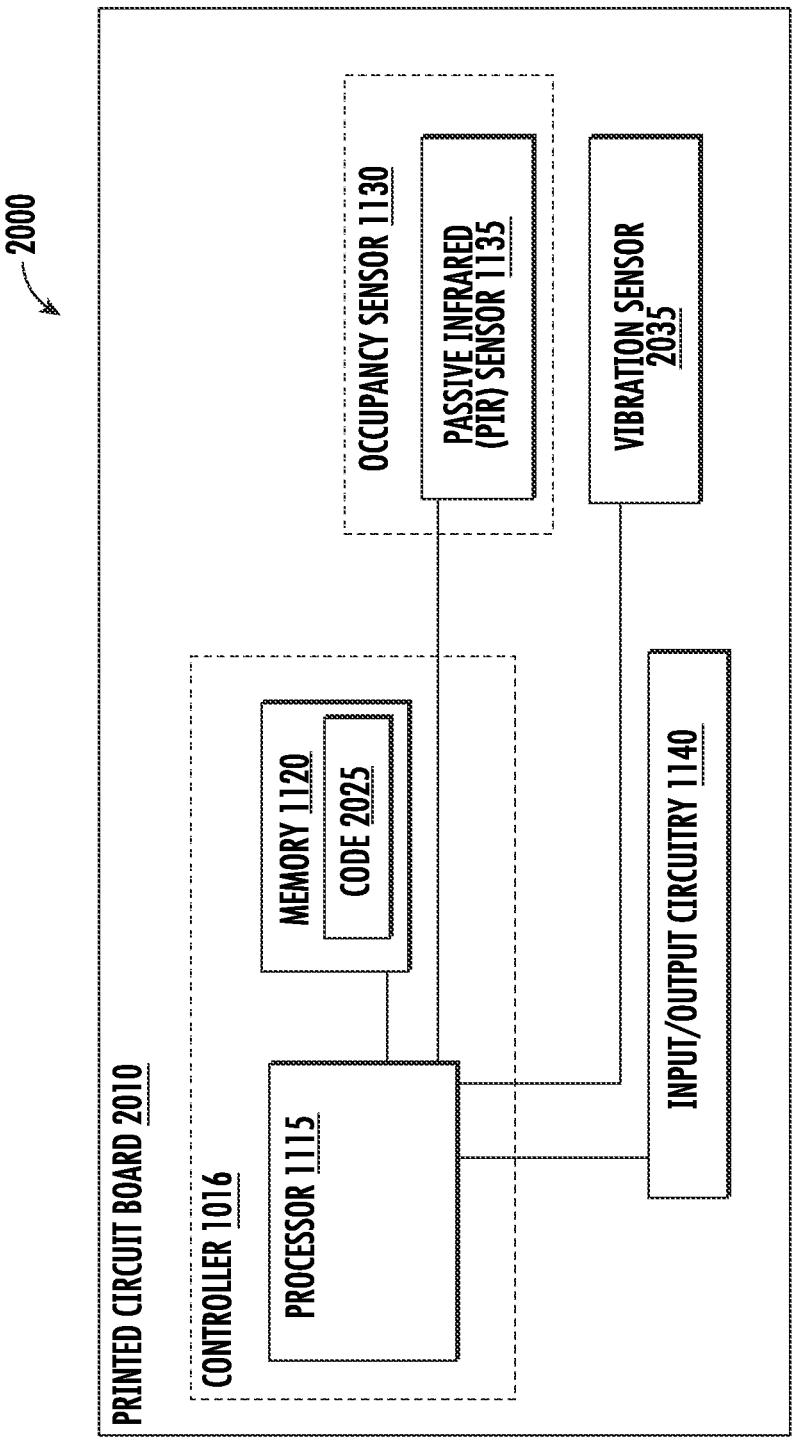
FIG. 2 illustrates an embodiment of a system including a processor, an occupancy sensor, a vibration sensor, memory, and an output.

FIG. 2 illustrates an embodiment of a system 2000 including a PCB 2010 coupled with controller 1016, an occupancy sensor 1130, a vibration sensor 2035, and input/output circuitry 1140. In the present embodiment, the controller 1016 may comprise a processor 1115 coupled with the memory 1120. In other embodiments, the PCB may comprise two or more PCBs coupled together and/or one or more components such as the occupancy sensor 1130, the vibration sensor 2035, and/or part of or all the input/output circuitry 1140 coupled with the PCB 2000 via one or more conductors directly or via connectors.

In the present embodiment, the memory 1120 comprises code 2025, which, when executed by the processor 1115 may correlate outputs of the PIR sensor 1135 and the vibration sensor 2035 to determine if the output signal from the PIR sensor 1135 represents a motion detection or a false trigger. In several embodiments, the processor 1115 may execute the code 2025 to determine the concurrency of a vibration detection via the vibration sensor 2035 and a motion detection from the PIR sensor 1135. If the output signals from the vibration sensor 2035 and the PIR sensor 1135 represent the same event, the processor 1115 may determine that the output signal from the PIR sensor 1135 is a false trigger. On the other hand, if the output from the vibration sensor 2035 and the PIR sensor 1135 do not correlate or there is not corresponding output signal from the vibration sensor 2035, the processor 1115 may determine that the output signal from the PIR sensor 1135 indicates detection of motion.

Figure 3A:
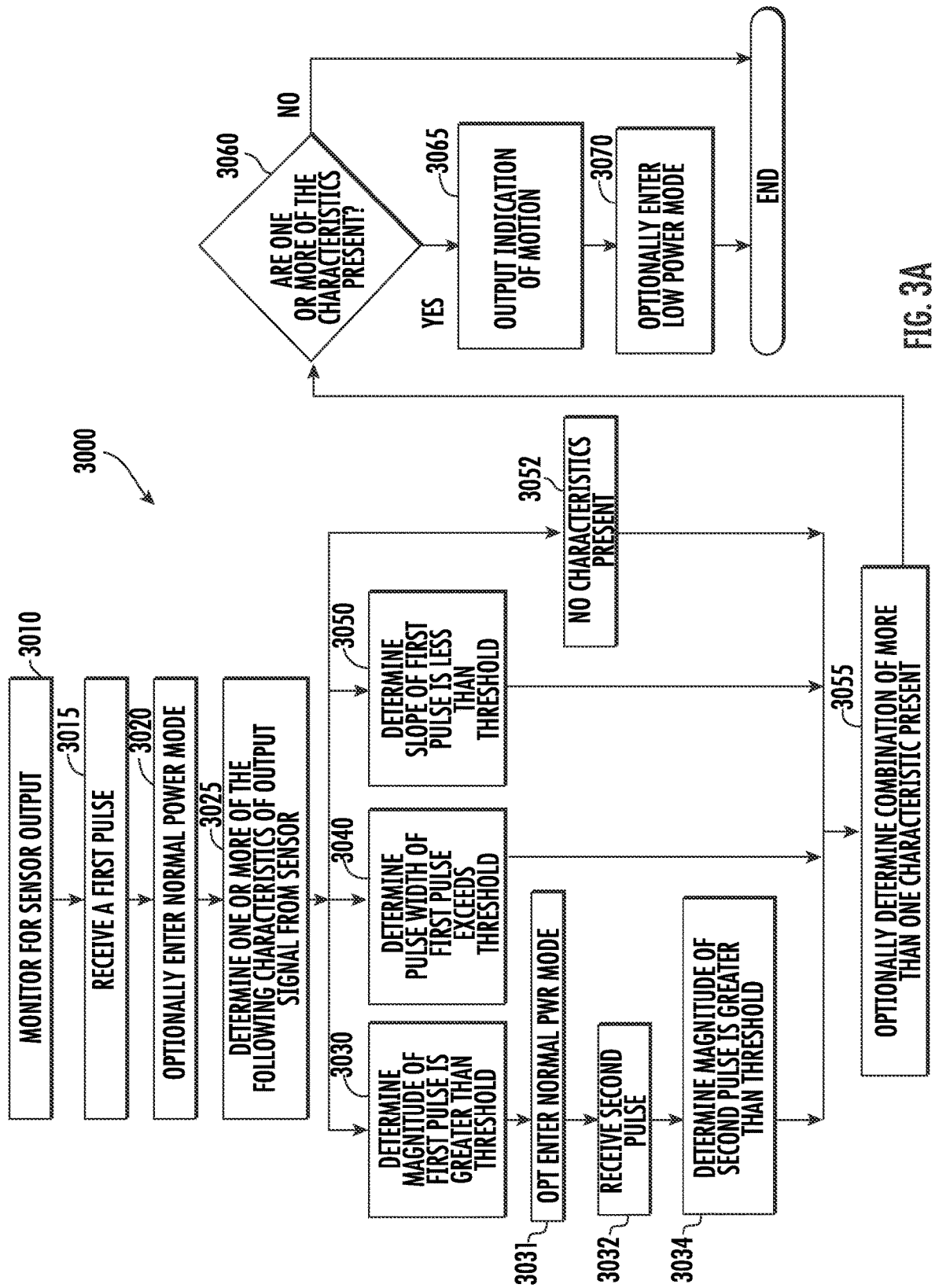
FIG. 3A illustrates an embodiment of a flowchart for the systems in FIG. 1A-E.

FIG. 3A illustrates an embodiment of a flowchart 3000 for the systems in FIG. 1A-E. The flowchart begins at element 3010 with monitoring for sensor output. A controller, such as the controller 1016 in FIGS. 1A-B and 2, may optionally operate in a low power mode to monitor for an output signal from an occupancy sensor. In response to receipt of a first pulse (element 3015), the processor 1115 may wake the occupancy sensor device such as the occupancy sensor systems 1010, 1100, and 2000 in FIGS. 1A-B and 2 to a normal power mode (element 3020) or a high-power consumption state for processing characteristics about the output signal. In other embodiments, the controller 1016 may optionally enter the normal power mode (element 3031) after a determination that the magnitude of the amplitude of the first pulse of the output signal from the occupancy sensor exceeds the threshold (element 3030).

At element 3025, the controller may determine one or more of the following characteristics of the output signal from the occupancy sensor. The characteristics include the magnitude of the amplitude of two or more consecutive pulses, the rate of change of a first pulse, and a pulse-width of the first pulse. Note that while the flowchart 3000 illustrates consecutive elements 3015 through 3050, these processes may occur concurrently. For instance, the monitoring the output signal may include triggering a response to the magnitude of the first pulse exceeding the threshold at element 3030 and the response may be to enter the normal power mode (element 3031) concurrently with receipt of the first pulse (element 3015) from in the output signal from the occupancy sensor. Furthermore, the levels of the elements 3030, 3040, and 3050 in the flowchart 3000 do not necessarily correlate to the timing of such actions. For instance, element 3030 could occur before or after or during element 3040 and/or element 3050.

After determining that the magnitude of the first pulse is greater than a threshold, the controller may optionally enter the normal power mode prior to or concurrently with receipt of the second pulse (element 3032). At element 3034, the controller may determine that the magnitude of the second pulse is greater than the threshold. Some embodiments may implement the processes in elements 3030 through 3034 and not the processes at elements 3040 and 3050. In such embodiments, the controller may determine that the occupancy sensor output indicates motion detection (element 3060). In response, the controller may output an indication of motion (element 3065) to the output circuitry and optional re-enter a low power mode (element 3070).

At element 3040, the controller may determine a pulse-width of the first pulse by, e.g., buffering the time at the start of the pulse and comparing the start time with or subtracting the start time from the end time identified for the first pulse in the output signal from the occupancy sensor. The controller may determine if the pulse-width exceeds a threshold to determine if the output signal is a motion detection and not a false trigger.

At element 3050, the controller may determine that the slope or rate of change of the first pulse is less than a threshold to determine if the output signal is a motion detection and not a false trigger. If none of the characteristics pass the processes in elements 3030 through 3050, the controller may determine that none of the characteristics of a motion detection are present in the output signal (element 3052) and determine at element 3060 to end the process.

At element 3055, the controller may optionally determine whether the output signal is based on motion detection rather than a false trigger by determining a combination of the characteristics in lieu of determining if at least one characteristic is present at element 3060. For instance, the controller may advantageously limit the decision that the output of the occupancy sensor represents motion detection of two or more characteristics in situations where embodiments might otherwise produce a high number of false triggers.

Figure 3B:
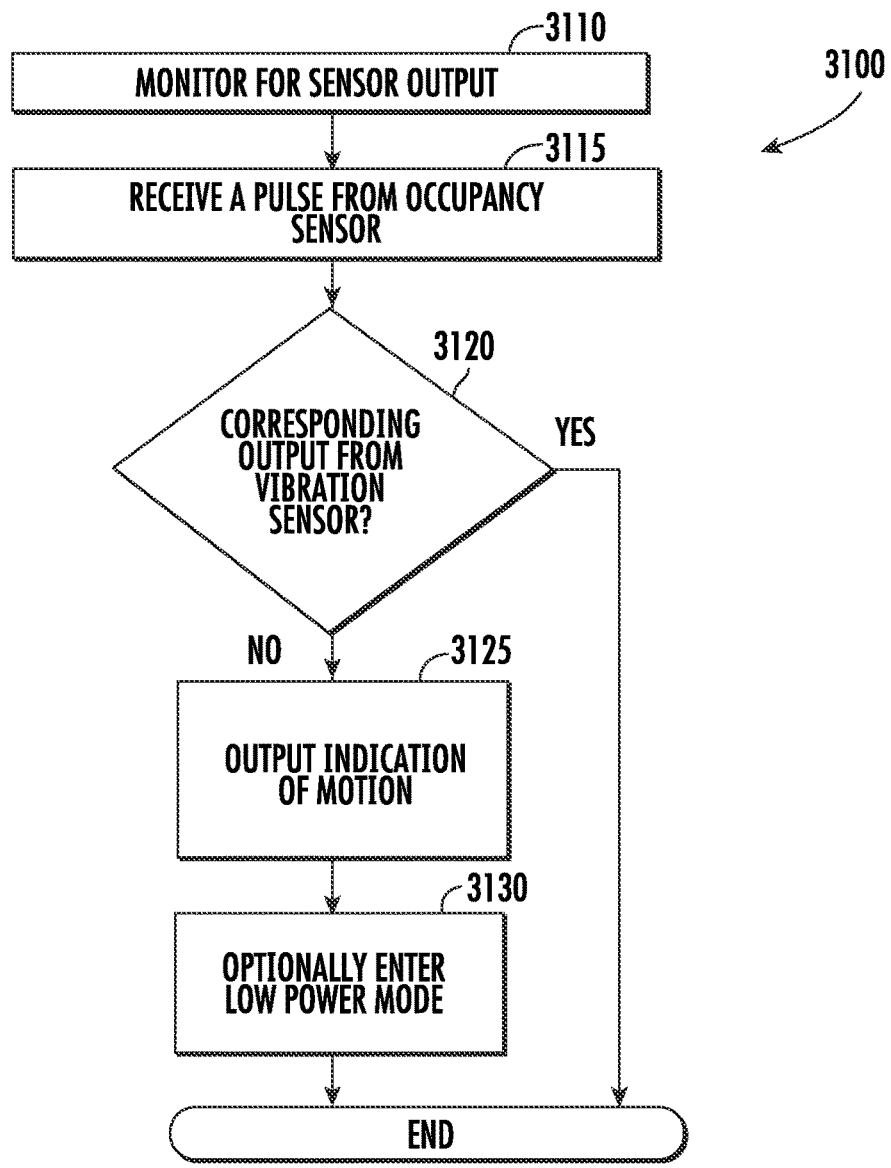
FIG. 3B illustrates an embodiment of a flowchart for the system in FIG. 2.

FIG. 3B illustrates an embodiment of a flowchart 3100 for the system in FIG. 2. The flowchart begins at element 3110 with monitoring the occupancy sensor output for a first pulse and monitoring an output of a vibration sensor for a corresponding signal. At element 3115, a controller, such as the controller 1016 in FIGS. 1A-B and 2, may receive a first pulse from the occupancy sensor and the controller may determine if the first pulse corresponds with an output from the vibration sensor at element 3120. If the first pulse does correspond to an output from the vibration sensor that indicates a vibration concurrent with the event causing the output from the occupancy sensor, the controller may determine that the output from the occupancy sensor is a false trigger return to monitoring the outputs of the sensors.

If no output from the vibration sensor corresponds with the output from the occupancy sensor, the controller may determine that the output from the occupancy sensor indicates and detection of motion (element 3120). In response, the controller may output an indication of motion (element 3125) to the output circuitry and optionally enter a low power mode.

Note that a system such as the system 2000 shown in in FIG. 2 may perform the processes in the flowchart 3000 in addition to the processes in the flowchart 3100. In such embodiments, the controller may perform a combination of the results to determine whether the output from the occupancy sensor represents a motion detection or a false trigger. Some embodiments may include a user-configurable combination that may include, e.g., majority vote, unanimous vote to determine the output indicates motion detection, unanimous vote to determine the output indicates a false trigger, a single vote to determine the output indicates motion detection, a single vote to determine the output indicates a false trigger, and the like. Each variation of the combination adjusts the balance between the possibility of an erroneous output of a false trigger or an erroneous output of a motion detection. Thus, each variation offers advantages and disadvantages for various uses for the occupancy sensor device and different environmental conditions or disturbances encountered by the occupancy sensor system.

Figure 4:
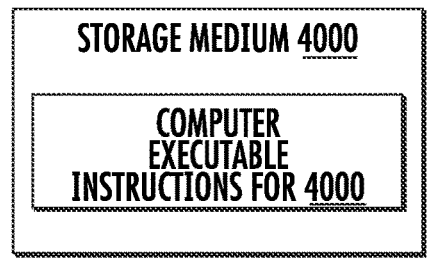
FIG. 4 illustrates an embodiment of a storage medium such as the memory in FIG. 1B.

FIG. 4 illustrates an example of a storage medium 4000 to store code such as the code 1012, 1125, and 2025 shown in FIGS. 1A-2. Storage medium 4000 may comprise an article of manufacture. In some examples, storage medium 4000 may include any non-transitory computer readable medium or machine-readable medium, such as an optical, magnetic or semiconductor storage. Storage medium 4000 may store diverse types of computer executable instructions, such as instructions to implement logic flows and/or techniques described herein. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

FURTHER EXAMPLES OF EMBODIMENTS

Below are further examples of embodiments such as the embodiments described above and illustrated in FIGS. 1-4.

Example 1 is an occupancy sensor device, comprising: a sensor configured to output a detection signal, the detection signal including one or more pulses, the one or more pulses comprising one or more characteristics indicative of either detection of a motion or detection of a disturbance; and a controller coupled with the sensor to receive the detection signal, the controller programmed to compare the one or more characteristics of the one or more pulses against a predetermined characteristic threshold, and based on the comparison, determine whether the one or more pulses indicate detection of the motion or detection of the disturbance. Example 2 is the occupancy sensor device of Example 1, wherein the sensor comprises a digital passive infrared (PIR) sensor and the disturbance comprises a vibration. Example 3 is the occupancy sensor device of Example 1, wherein the controller further comprises a controller output configured to provide a characterized detection signal indicating either the detected motion or the detected disturbance. Example 4 is the occupancy sensor device of Example 3, further comprising a transceiver coupled to the controller output, the transceiver configured to communicate the characterized detection signal to a remote device. Example 5 is the occupancy sensor device of Example 4, wherein the communication interface is configured to wirelessly transmit a packet in response to the indication of motion in accordance with a wireless communications protocol, wherein the communication interface is capable of transmitting the packet in accordance with one or more wireless communications protocols from a group of wireless communications protocols consisting of a Wi-Fi communications protocol, a Bluetooth communications protocol, a ZigBee communications protocol, a Z-Wave communications protocol; and a cellular communications protocol. Example 6 is the occupancy sensor device of Example 3, further comprising an indicator coupled to the controller output, the indicator configured to indicate the characterized detection signal. Example 7 is the occupancy sensor device of Example 6, wherein the indicator comprises a visible indicator or an audible indicator. Example 8 is the occupancy sensor device of Example 3, further comprising a controllably conductive device coupled to the controller, the controllably conductive device arranged and configured to selectively control the ON/OFF state of an electrical load in response to the detected motion. Example 9 is the occupancy sensor device of Example 1, further comprising a housing to contain components of the occupancy sensor device, wherein the housing is adapted to couple the system with an electrical junction box. Example 10 is the occupancy sensor device of Example 1, wherein comparison of the one or more characteristics of the one or more pulses from the sensor comprises monitoring a first pulse of the one or more pulses to detect a magnitude that exceeds the predetermined characteristic threshold and monitoring a second pulse of the one or more pulses for a magnitude that exceeds the predetermined characteristic threshold. Example 11 is the occupancy sensor device of Example 10, further comprising a user input to select a sensitivity for the sensor, wherein the sensitivity is related to a value for the predetermined characteristic threshold. Example 12 is the occupancy sensor device of Example 11, wherein the user input comprises a switch. Example 13 is the occupancy sensor device of Example 11, wherein the user input comprises an intensity bar. Example 14 is the occupancy sensor device of Example 11, wherein the user input comprises a communication interface to receive a sensitivity setting via a wireless communication. Example 15 is the occupancy sensor device of Example 11, the user input to select one of three preset sensitivities for the sensor, wherein each of the three preset sensitivities is associated with a different value for the predetermined characteristic threshold. Example 16 is the occupancy sensor device of Example 1, wherein comparison of the one or more characteristics of one or more pulses from the sensor comprises sampling a slope of a rising or falling edge of a first pulse of the one or more pulses to detect a rate of change that is less than the predetermined characteristic threshold. Example 17 is the occupancy sensor device of Example 1, wherein comparison of the one or more characteristics of one or more pulses from the sensor comprises determining a pulse-width of a first pulse of the one or more pulses exceeds the predetermined characteristic threshold. Example 18 is the occupancy sensor device of Example 1, wherein comparison of the one or more characteristics of one or more pulses from the sensor comprises a combination of two or more comparisons from a group of comparisons consisting of: monitoring a first pulse of the one or more pulses to detect a magnitude that exceeds a pulse threshold and monitoring a second pulse of the one or more pulses for a magnitude that exceeds the pulse threshold; sampling a slope of a rising or falling edge of a first pulse of the one or more pulses to detect a rate of change that is less than a rate of change threshold; and determining that a pulse-width of a first pulse of the one or more pulses exceeds a pulse-width threshold.

Example 17 is an occupancy sensor device, comprising: an occupancy sensor to output a detection signal, the detection signal including one or more pulses comprising one or more characteristics indicative of either detection of a motion or a false trigger responsive to a vibration; a vibration sensor to output a signal responsive to a vibration of the sensor; a controller coupled with the vibration sensor to detect a vibration and coupled with the occupancy sensor to determine if an output from the occupancy sensor of one or more pulses indicates detection of motion or indicates a false trigger responsive to vibration; to determine that the output from the occupancy sensor of one or more pulses indicates detection of motion in the absence of a corresponding signal from the vibration sensor; and to output an indication of motion in response to a determination that the one or more pulses indicate detection of motion by the occupancy sensor. Example 18 is the device of Example 17, wherein the occupancy detector comprises a digital passive infrared (PIR) sensor. Example 19 is the device of Example 17, wherein the controller comprises memory to store code and a processor coupled with the memory to execute the code. Example 20 is the device of Example 17, further comprising output circuitry coupled with the controller to output an indication of motion in response to a determination that the one or more pulses indicate motion. Example 21 is the device of Example 20, wherein the output circuitry comprises an indicator, wherein the indicator outputs a light or audible signal in response to the indication of motion output by the controller. Example 22 is the device of Example 21, wherein the output circuitry comprises an actuator to power a load in response to the indication of motion output by the controller. Example 23 is the device of Example 21, further comprising a housing to contain components of the system, wherein the housing is adapted to couple the system with an electrical junction box. Example 24 is the device of Example 21, wherein the output circuitry comprises a communications interface to output the indication of motion via a wireless communications protocol. Example 25 is the device of Example 24, wherein the communication interface is configured to wirelessly transmit a packet in response to the indication of motion in accordance with a wireless communications protocol, wherein the communication interface is capable of transmitting the packet in accordance with one or more wireless communications protocols from a group of wireless communications protocols consisting of a Wi-Fi communications protocol, a Bluetooth communications protocol, a ZigBee communications protocol, a Z-Wave communications protocol; and a cellular communications protocol. Example 26 is the device of Example 1, wherein comparison of the one or more characteristics of one or more pulses from the occupancy sensor comprises monitoring a first pulse of the one or more pulses to detect a magnitude that exceeds the threshold and monitoring a second pulse of the one or more pulses for a magnitude that exceeds the threshold. Example 27 is the device of Example 26, further comprising a user input to select a sensitivity for the occupancy sensor, wherein the sensitivity is associated with a value for the threshold. Example 28 is the device of Example 27, wherein the user input comprises a switch. Example 29 is the device of Example 27, wherein the user input comprises an intensity bar. Example 30 is the device of Example 27, wherein the user input comprises a communication interface to receive a sensitivity setting via a wireless communication.

Example 31 is a non-transitory computer-readable medium comprising computer-readable code, the computer-readable code, when executed by a processor, to perform operations, the operations to: compare one or more characteristics of one or more pulses from a sensor against a predetermined characteristic threshold; determine, based on the comparison, whether the one or more pulses indicate detection of motion or are responsive to vibration; and output an indication of detection of motion in response to a determination that the one or more pulses indicate detection of motion. Example 32 is the non-transitory computer-readable medium of Example 31, wherein the operations further comprise operations to cause wireless transmission of a packet in response to the indication of detection of motion in accordance with a wireless communications protocol. Example 33 is the non-transitory computer-readable medium of Example 32, wherein the operations cause a communication interface capable of transmitting the packet in accordance with the wireless communications protocol to transmit the packet via a wireless communications protocol selected from a group of wireless communications protocols consisting of a Wi-Fi communications protocol, a Bluetooth communications protocol, a ZigBee communications protocol, a Z-Wave communications protocol; and a cellular communications protocol. Example 34 is the non-transitory computer-readable medium of Example 31, wherein comparison of the one or more characteristics of one or more pulses from the sensor comprises monitoring a first pulse of the one or more pulses to detect a magnitude that exceeds the predetermined characteristic threshold and monitoring a second pulse of the one or more pulses for a magnitude that exceeds the predetermined characteristic threshold. Example 35 is the non-transitory computer-readable medium of Example 31, further comprising setting the predetermined characteristic threshold in response to a user input to select a sensitivity for the occupancy sensor, wherein the sensitivity is associated with a value for the predetermined characteristic threshold. Example 36 is the non-transitory computer-readable medium of Example 35, the user input to select one of three preset sensitivities for the sensor, wherein each of the three preset sensitivities is associated with a different value for the predetermined characteristic threshold. Example 37 is the non-transitory computer-readable medium of Example 31, wherein comparison of the one or more characteristics of one or more pulses from the sensor comprises sampling a slope of a rising or falling edge of a first pulse of the one or more pulses to detect a rate of change that is less than the predetermined characteristic threshold. Example 38 is the non-transitory computer-readable medium of Example 31, wherein comparison of the one or more characteristics of one or more pulses from the sensor comprises determining a pulse-width of a first pulse of the one or more pulses exceeds the predetermined characteristic threshold. Example 39 is the non-transitory computer-readable medium of Example 31, wherein comparison of the one or more characteristics of one or more pulses from the sensor comprises a combination of two or more comparisons from a group of comparisons consisting of: monitoring a first pulse of the one or more pulses to detect a magnitude that exceeds a pulse threshold and monitoring a second pulse of the one or more pulses for a magnitude that exceeds the pulse threshold; sampling a slope of a rising or falling edge of a first pulse of the one or more pulses to detect a rate of change that is less than a rate of change threshold; and determining a pulse-width of a first pulse of the one or more pulses exceeds a pulse-width threshold.

We claim:

1. An occupancy sensor device, comprising:
a sensor configured to output a detection signal, the detection signal including one or more pulses, the one or more pulses comprising one or more characteristics indicative of either detection of a motion or detection of a mechanical disturbance; and
a controller coupled with the sensor to receive the detection signal, the controller programmed to compare the one or more characteristics of the one or more pulses against a predetermined characteristic threshold, and based on the comparison, determine whether the one or more pulses indicate detection of the motion or detection of the mechanical disturbance, wherein a determination that the detection signal is based on the mechanical disturbance comprises:
a determination that a magnitude of at least a first pulse of the one or more pulses, exceeds a magnitude threshold, wherein the predetermined characteristic threshold comprises the magnitude threshold;
a determination that a pulse width of a first pulse of the one or more pulses is less than the pulse-width threshold, wherein the predetermined characteristic threshold comprises the pulse-width threshold;
a determination that a slope of a first pulse of the one or more pulses exceeds a rate of change threshold, wherein the predetermined characteristic threshold comprises the rate of change threshold; or
a combination thereof.

2. The occupancy sensor device of claim 1, wherein the sensor comprises a digital passive infrared (PIR) sensor and the mechanical disturbance comprises a vibration.

3. The occupancy sensor device of claim 1, wherein the controller further comprises a controller output configured to provide a characterized detection signal indicating a motion or indicating the mechanical disturbance.

4. The occupancy sensor device of claim 1, wherein comparison of the one or more characteristics of the one or more pulses from the sensor comprises monitoring a first pulse of the one or more pulses to detect a magnitude that exceeds the predetermined characteristic threshold and monitoring a second pulse of the one or more pulses for a magnitude that exceeds the predetermined characteristic threshold.

5. The occupancy sensor device of claim 4, further comprising a user input to select a sensitivity for the sensor, wherein the sensitivity is related to a value for the predetermined characteristic threshold, wherein the user input comprises a switch, an intensity bar, a communication interface, or a combination thereof.

6. The occupancy sensor device of claim 5, the user input to select one of three preset sensitivities for the sensor, wherein each of the three preset sensitivities is associated with a different value for the predetermined characteristic threshold.

7. The occupancy sensor device of claim 1, wherein comparison of the one or more characteristics of one or more pulses from the sensor comprises sampling a slope of a rising or falling edge of a first pulse of the one or more pulses to detect a rate of change that is less than the predetermined characteristic threshold.

8. The occupancy sensor device of claim 1, wherein comparison of the one or more characteristics of one or more pulses from the sensor comprises determining a pulse-width of a first pulse of the one or more pulses exceeds the predetermined characteristic threshold.

9. The occupancy sensor device of claim 1, wherein comparison of the one or more characteristics of one or more pulses from the sensor comprises a combination of two or more comparisons from a group of comparisons consisting of:
monitoring the first pulse of the one or more pulses to detect a first magnitude that exceeds the magnitude threshold and monitoring a second pulse of the one or more pulses for a second magnitude that exceeds the magnitude threshold;
sampling a slope of a rising or falling edge of a first pulse of the one or more pulses to detect a rate of change that exceeds a rate of change threshold; and
determining that a pulse-width of a first pulse of the one or more pulses is less than a pulse-width threshold.

10. An occupancy sensor device, comprising:
an occupancy sensor to output a detection signal, the detection signal including one or more pulses comprising one or more characteristics indicative of either detection of a motion or a false trigger responsive to a mechanical disturbance;
a controller coupled with the occupancy sensor to determine if an output from the occupancy sensor of one or more pulses indicates detection of motion or indicates a false trigger responsive to the mechanical disturbance; to determine that the detection signal is based on the mechanical disturbance if:
a magnitude of at least a first pulse of the one or more pulses, exceeds a magnitude threshold;
a pulse width of a first pulse of the one or more pulses is less than the pulse-width threshold;
a slope of a first pulse of the one or more pulses exceeds a rate of change threshold; or a combination thereof;
to determine that the output from the occupancy sensor of one or more pulses indicates detection of motion in the absence of a determination that the detection signal is based on the mechanical disturbance; and to output an indication of motion in response to a determination that the one or more pulses indicate detection of motion by the occupancy sensor.

11. The device of claim 10, wherein the occupancy detector comprises a digital passive infrared (PIR) sensor.

12. The device of claim 10, wherein the controller comprises memory to store code and a processor coupled with the memory to execute the code.

13. The device of claim 10, further comprising output circuitry coupled with the controller to output an indication of motion in response to a determination that the one or more pulses indicate motion, wherein the output circuitry comprises an indicator, an actuator, or a combination thereof.

14. The device of claim 13, further comprising a housing to contain components of the system, wherein the housing is adapted to couple the system with an electrical junction box.

15. The device of claim 1, wherein comparison of the one or more characteristics of one or more pulses from the occupancy sensor comprises monitoring the first pulse of the one or more pulses to detect a first magnitude that exceeds the magnitude threshold and monitoring a second pulse of the one or more pulses for a second magnitude that exceeds the magnitude threshold.

16. The device of claim 15, further comprising a user input to select a sensitivity for the occupancy sensor, wherein the sensitivity is associated with a value for the threshold.

17. The device of claim 16, wherein the user input comprises a switch, an intensity bar, a communication interface to receive a sensitivity setting via a wireless communication, or a combination thereof.

18. A non-transitory computer-readable medium comprising computer-readable code, the computer-readable code, when executed by a processor, to perform operations, the operations to:
compare one or more characteristics of one or more pulses from a sensor against a predetermined characteristic threshold, wherein:
the one or more characteristics comprise a magnitude of at least a first pulse of the one or more pulses and the predetermined characteristic threshold comprises a magnitude threshold;
the one or more characteristics comprise a pulse width of the first pulse of the one or more pulses and the predetermined characteristic threshold comprises a pulse-width threshold;
the one or more characteristics comprise a slope of the first pulse of the one or more pulses and the predetermined characteristic threshold comprises a rate of change threshold; or
a combination thereof;
determine, based on the comparison, whether the one or more pulses indicate detection of motion or are responsive to a mechanical disturbance; and
output an indication of detection of motion in response to a determination that the one or more pulses indicate detection of motion.

19. The non-transitory computer-readable medium of claim 18, wherein comparison of the one or more characteristics of one or more pulses from the sensor comprises monitoring the first pulse of the one or more pulses to detect a first magnitude that exceeds the magnitude threshold and monitoring a second pulse of the one or more pulses for a second magnitude that exceeds the magnitude threshold.

20. The non-transitory computer-readable medium of claim 18, further comprising setting the predetermined characteristic threshold in response to a user input to select a sensitivity for the occupancy sensor, wherein the sensitivity is associated with a value for the predetermined characteristic threshold.

21. The non-transitory computer-readable medium of claim 20, the user input to select one of three preset sensitivities for the sensor, wherein each of the three preset sensitivities is associated with a different value for the predetermined characteristic threshold.

22. The non-transitory computer-readable medium of claim 18, wherein comparison of the one or more characteristics of one or more pulses from the sensor comprises sampling the slope of a rising or falling edge of the first pulse of the one or more pulses to detect a rate of change that is less than the predetermined characteristic threshold.

23. The non-transitory computer-readable medium of claim 18, wherein comparison of the one or more characteristics of one or more pulses from the sensor comprises determining a pulse-width of a first pulse of the one or more pulses exceeds the predetermined characteristic threshold.

24. The non-transitory computer-readable medium of claim 18, wherein comparison of the one or more characteristics of one or more pulses from the sensor comprises a combination of two or more comparisons from a group of comparisons consisting of:
monitoring the first pulse of the one or more pulses to detect a first magnitude that is less than the magnitude threshold and monitoring a second pulse of the one or more pulses for a second magnitude that is less than the magnitude threshold;
sampling a slope of a rising or falling edge of the first pulse of the one or more pulses to detect a rate of change that is less than the rate of change threshold; and
determining the pulse-width of the first pulse of the one or more pulses exceeds the pulse-width threshold.

25. The occupancy sensor device of claim 1, wherein mechanical disturbance is a mechanical impact.

26. The non-transitory computer-readable medium of claim 18, wherein mechanical disturbance is a mechanical impact.

27. The non-transitory computer-readable medium of claim 18, wherein a determination that the detection signal is responsive to vibration is based on a determination that:
   the magnitude of the at least the first pulse exceeds the magnitude threshold;
   the pulse width of the first pulse is less than the pulse width threshold;
   the slope of the first pulse exceeds the rate of change threshold; or
   a combination thereof.

* * * * *